United States Patent [19]

Matzke et al.

[11] Patent Number: 5,417,806
[45] Date of Patent: May 23, 1995

[54] METHOD OF REMOVING FINE CONTAMINANTS FROM USED PAPER FIBRE MATERIAL

[75] Inventors: Wolfgang Matzke, Berg; Bruno Michelewski, Wilhelmsdorf, both of Germany

[73] Assignee: Sulzer-Escher Wyss GmbH, Ravensburg, Germany

[21] Appl. No.: 963,404

[22] Filed: Oct. 19, 1992

[30] Foreign Application Priority Data

Oct. 19, 1991 [DE] Germany .................. 41 34 607.6

[51] Int. Cl.⁶ .............................................. D21B 1/32
[52] U.S. Cl. .................................. 162/4; 162/28; 162/55; 162/60; 162/261; 209/164; 209/165; 209/168; 209/169; 210/173; 210/259; 210/294; 210/322; 210/703
[58] Field of Search ............... 162/4, 5, 28, 55, 261, 162/60; 209/164, 165, 168, 169; 210/703, 173, 259, 294, 322

[56] References Cited

U.S. PATENT DOCUMENTS

| | | | |
|---|---|---|---|
| 4,331,534 | 5/1982 | Barnscheidt | 162/4 |
| 4,332,638 | 6/1982 | Mauer et al. | 162/4 |
| 4,865,690 | 9/1989 | Bernard et al. | 162/4 |

FOREIGN PATENT DOCUMENTS

| | | |
|---|---|---|
| 0284526B1 | 12/1992 | European Pat. Off. |
| 2805445 | 9/1978 | Germany .................. 162/4 |
| 3605259 | 7/1987 | Germany .................. 162/4 |
| 2064376 | 6/1981 | United Kingdom ......... 162/4 |
| 2172525 | 9/1986 | United Kingdom ......... 162/4 |

OTHER PUBLICATIONS

Pfalzer, "Deinking of Secondary Fibers A Comparison of Washing and Flotation," *TAPPI* (Sep. 1980) vol. 63 No. 9, pp. 113–116.

*Primary Examiner*—Peter Chin
*Attorney, Agent, or Firm*—Townsend and Townsend Khourie and Crew

[57] ABSTRACT

A method of removing fine contaminants from waste paper fibrous material (S) is described with solution (1) and pre cleaning (2) whereupon the fibrous material is first subjected to a washing treatment (3) and then to a flotation treatment (5). The washing filtrate (12) from the washing treatment (3) is cleaned in a filtrate-flotation treatment (4) so that a cleaned fraction (14) can be returned into the useful material (13) of the washing treatment. The so cleaned waste paper fibrous material can be passed to further treatment steps such as flotation, bleaching and/or dispersion. The reject material from the filtrate-flotation (4) is, in one embodiment, again subjected to a flotation treatment.

18 Claims, 4 Drawing Sheets

METHOD OF REMOVING FINE CONTAMINANTS FROM USED PAPER FIBRE MATERIAL

BACKGROUND OF INVENTION

The invention relates to method of removing fine contaminants from used paper fibre material wherein, after suspension in water—by—the so-called solution treatment and optional pre-cleaning treatment, the used paper fibre material is cleaned by at least one washing treatment and a directly or indirectly following flotation treatment to remove fine contaminants contained therein, whereby both a washing filtrate and also a flotation foam arise as fractions, both of said fractions being enriched with the contaminants, i.e. containing an elevated proportion of said contaminants. The invention also relates to apparatus for carrying out such methods.

BRIEF DISCUSSION OF THE PRIOR ART

It is known, when using printed waste paper or used paper for the production of paper (recycling), that in many cases it is necessary to remove the particles of printing ink. For this purpose use is made, as is known per se, of washing treatments or flotation treatments or combinations of these treatments. In such cleaning steps the particles of printing ink which have been separated from the paper fibres during the preceding treatment of the used paper, i.e. which no longer stick to the paper fibres, are separated off. In so doing use is made either of the hydrophobic nature of the printing inks (selective flotation) or of their substantially smaller dimensions in comparison to the fibres.

Similar solutions are, moreover, also applicable to other solid material particles if these are undesired in the later produced paper, such as for example the so-called ashes or remainders of adhesive substances, so-called "stickies".

It is further known that such methods of preparation as a rule include further measures in order to prepare the contaminants, in particular printing inks, which are separated out from the main flow of the stream of fibre material so that the actual contamination is capable of being dumped and also so that the water which is being branched off and cleaned during removal of the contaminants and also still exploitable fibre material, filling materials and fine substances can be returned into the production circuit. It has been shown that the three requirements, namely the requirement for ideal product characteristics, the requirement for the smallest possible losses of fibre materials, further solid materials and water, and also the requirement for good disposability of the contaminants are difficult to reconcile one with the other.

In order to avoid difficulties with the paper which is produced it was previously necessary to accept the fact that the particles which are removed from the paper material through the washing process had to be substantially fully removed from the washing filtrate and rejected. This resulted in a disadvantageous manner in a large quantity of materials to be disposed of and also in a smaller yield from the raw material which is used, i.e. from the used paper. On the other hand, when very fine contaminants are present, quality penalties often arose since they could only be insufficiently removed from processes with higher yields. By way of example, European patent application publication number 0 284 526 shows a process in which a washing treatment which embraces the fine contaminants first takes place at the end of the preparation processes. In a prior deinking flotation treatment valuable substances are lost and lead to an unnecessary burden for the refuse depository or dump.

PRINCIPAL OBJECT OF THE INVENTION

The invention is based on the object of so contriving the preparation method and apparatus that, while producing a paper which meets the quality requirements, the largest possible proportion of the waste paper which is used can be exploited and the amount of contamination which has to be dumped can be kept as small as possible.

BRIEF DESCRIPTION OF THE INVENTION

This object is fully satisfied by the invention in a method of the initially named kind but characterised in that the washing filtrate is subjected to a filtrate flotation treatment which generates a flotation foam enriched with contaminants and a cleaned fraction, the filtrate-flotation material., and in that this filtrate-flotation material is fed at least in part to the material from the washing process.

The subsequent subordinate claims set forth special layouts of the method which permit the underlying object to be solved in a more economical or more efficient manner.

With the aid of this method it is possible, at an early stage, to separate out from the used paper fibre material which is to be used for the generation of paper, a large proportion of the disturbing fine particles, in particular also the very fine particles which are difficult to obtain by flotation together with the fibre material. Through the action of the said filtrate-flotation treatment the particularly fine contaminants are removed from the washing filtrate which is enriched with the same and the process can be intentionally controlled so that the removal of these fine contaminants is efficient. In this way it is possible to return fine fibrous materials and ashes which may eventually be contained in the cleaned fraction to a point in the washing process if they are to be further reused. This re-introduction is possible immediately after the washing treatment, i.e. directly into the useful material generated there. It is, however, also possible at later positions of the main flow which forwards the useful material. Thus the possibility arises of ensuring an ideal utilisation of the added fibre material, i.e. to increase the yield and to reduce the quantity of waste material to be dumped.

The method of the invention can be used with particular advantage with used paper which is printed with coloured dyes which break up during solution into particularly fine particles. The so-called flexo-inks with water-based binders are to be regarded as such coloured materials. It is however also conceivable that other particularly fine contaminants can be removed with advantage through the method of the invention.

The fact that any eventually present residual contaminants in the cleaned fraction which flows back from the filtrate-flotation into the main material flow can be removed or made invisible through subsequent one stage or multi-stage flotation or bleaching or both is to be regarded as a further advantage of the method of the invention.

An advantage of the method is also to be found in the fact that the flotation treatment of the washing filtrate is particularly effective since the washing filtrate is admittedly enriched with fine contaminating particles but is, in contrast to the deinking flotation, at least essentially free of larger fibres which impair the flotation action. In this way the removal of the very fine disturbing material particles is achieved in a particularly effective manner.

The treatments can be particularly advantageously conceived and practised since the operating conditions in the filtrate-flotation treatment which deals with the washing filtrate from the washing process can be selected so that, depending on the requirement, a part of the fine material contained in the washing filtrate passes out with the cleaned water leaving the filtrate-flotation plant and can be returned into the main flow of material. It has been shown that really good results can be achieved when the flotation foam of the filtrate-flotation plant contains approximately one third of the solid material contained in the inflow. At this point an optimisation is naturally possible through selection of these operating parameters.

LIST OF DRAWINGS

The inventive method will be explained further in the drawings in which:

FIGS. 1, 2 and 3 show a schematic layout of the method of the invention,

FIG. 4 schematically illustrates a plant for the practising of the method, and

FIG. 5 schematically shows a further plant for the practising of the method.

DESCRIPTION OF PREFERRED EMBODIMENTS

Figure 1:
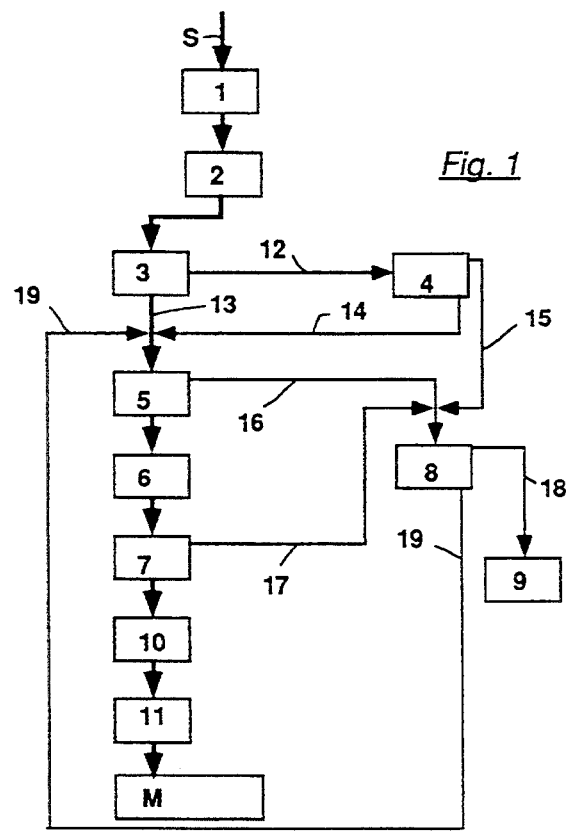

With respect to the example of FIG. 1, the used paper material S is supplied to the pulping treatment 1 which is followed by the precleaning treatment 2 and a washing treatment 3. The solution or pulping treatment produces a suspension or slurry of fibrous material with other desired and undesired material in an aqueous medium. The washing filtrate 12 passes into the filtrate-flotation treatment 4 from which a cleaned fraction 14 flows back into the useful material 13 from the washing treatment 3. The filtrate-flotation foam 15 passes into the reject flotation treatment 8 the flotation foam 18 of which is led off into the reject material preparation and/or concentration stage 9 where it is converted into a dumpable form. The cleaned water 19 from the reject flotation treatment 8 is in this case likewise supplied to the useful material 13 from the washing process 3. A different use of this water is however also conceivable such as its use during the solution treatment 1, during the pre-cleaning treatment 2 or during the washing treatment 3. In the flotation treatment 5 which follows the washing treatment 3 a flotation foam 16 is formed and can likewise pass for preparation into the reject flotation treatment 8. In the embodiment of the method shown here, which is a particularly effective embodiment, the flotation process 5 is followed by a further flotation treatment 7 after the fibrous material has been treated in a dispersing stage 6 such that, amongst other things, a further separation of eventually adherent particles of disturbing substances can take place. This dispersing treatment can also be advantageously combined with a bleaching treatment. After the said further flotation treatment 7 a thickening or concentration treatment 10 and a post-bleaching treatment 11 can take place, the material then passes into the paper machine supply M. As a rule the flotation foam 17 from the further flotation treatment 7 is likewise supplied to the reject flotation treatment 8.

Figure 2:
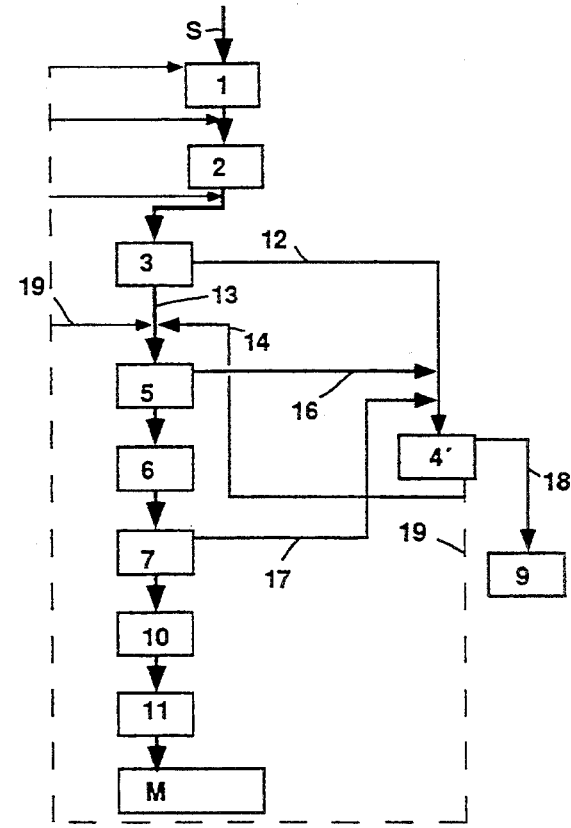

According to FIG. 2 the process is varied. Here the treatment of the washing filtrate is carried out in this case in an integral reject flotation treatment 4' where the flotation foams 16 and 17 are also prepared or worked up in addition to the washing filtrate 12. It is also shown that parts of the cleaned water can also be exploited for dilution (broken lines) at other points of the material preparation process.

Figure 3:
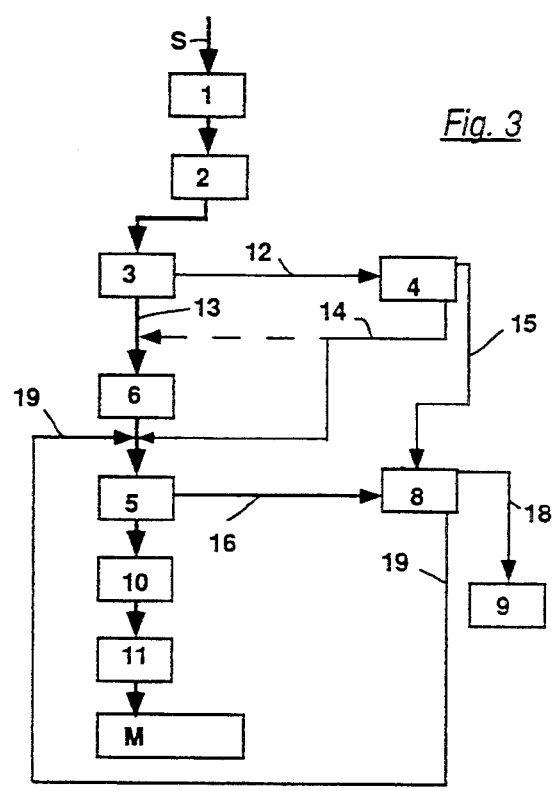

FIG. 3 shows schematically a process which is simplified in comparison to FIG. 1 in which a single flotation treatment 5 is sufficient for the main flow. When, as shown here, the dispersing stage 6 lies upstream of the flotation treatment then it particularly promotes the separation of the particles of contamination which is favourable for the subsequent flotation treatment 5. In this case the cleaned fraction 14 from the filtrate-flotation treatment 4 can also be supplied into the inlet to the flotation treatment 5 for the main flow. If the dispersing stage 6 follows the flotation treatment then it serves essentially to bring the residual contaminants to a level below the deleterious limit. It is important that in each case the preceding washing treatment 3 keeps low the danger of fine particles being rubbed into the fibrous material during the dispersing treatment (greying effect!). The dispersing treatment can however also be omitted under some circumstances when less stringent quality requirements exist.

These said variations are independent from one another and freely combinable with one another.

Figure 4:
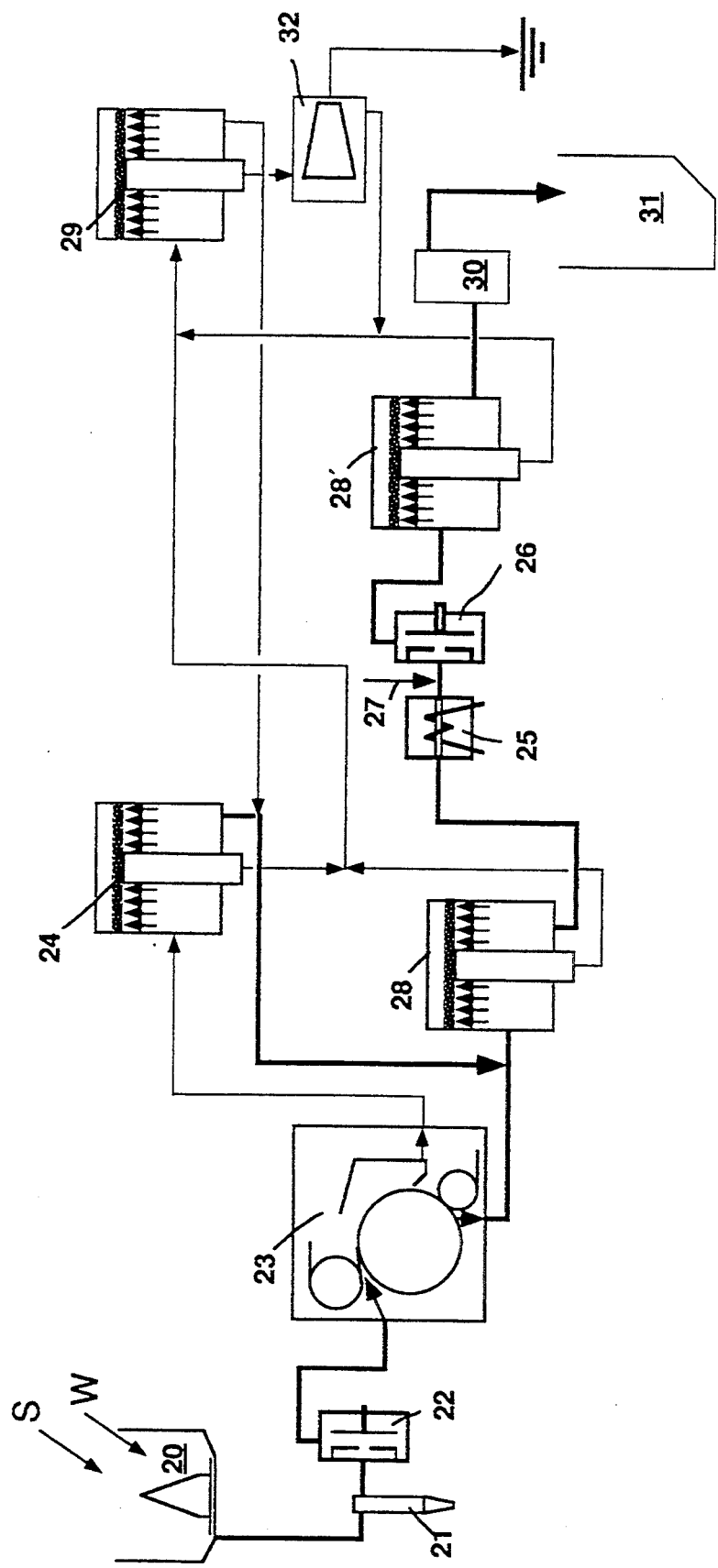

FIG. 4 shows in a schematic arrangement a plant in which the method of the invention can be practised, with this plant operating particularly effectively as a result of the plurality of different method stages. The material S is dissolved or disseminated in a high consistency material pulper 20 with water W, is passed to a cleaning stage 21 and to a deflaker 22 and then passes into a high power washer 23. The contaminated filtrate is passed to a filtrate flotation cell 24. The cleaned material then passes together with the cleaned water out of the filtrate flotation cell 24 into a deinking flotation cell 28,, The cleaned material from the deinking flotation cell passes after thickening or concentration which is not illustrated into a heated scroll 25 in which it is heated up to a temperature of almost 100° C. The addition of a bleaching agent 27 and the treatment in a dispersing apparatus 26 then follows. As already mentioned a further improvement of the material quality can be achieved through a subsequent flotation cell 28', which is however not always necessary. The useful material from this further flotation cell 28' comes, after a further bleaching treatment 30, into the storage vat 31. From there it can be drawn as required by the paper producing machine. The flotation foams of the previously named flotation cells 24, 28 and 28' all pass into a clarification flotation cell 29 serving as a reject flotation treatment. The foam of this clarification flotation cell is in turn rejected after thickening or concentration, for example in a centrifuge 32. The cleaned water is expediently returned to the clarification flotation cell 29.

The plant shown in FIG. 4 is relatively complex and brings the best results. With less stringent requirements it is however straightforwardly conceivable to omit the flotation cell 28' and the post bleaching treatment 30. Furthermore, as the claims show, other sequences of the method steps are also possible. Moreover, a different concept can also be selected for the mechanical cleaning of the pulped or disseminated material.

Figure 5:
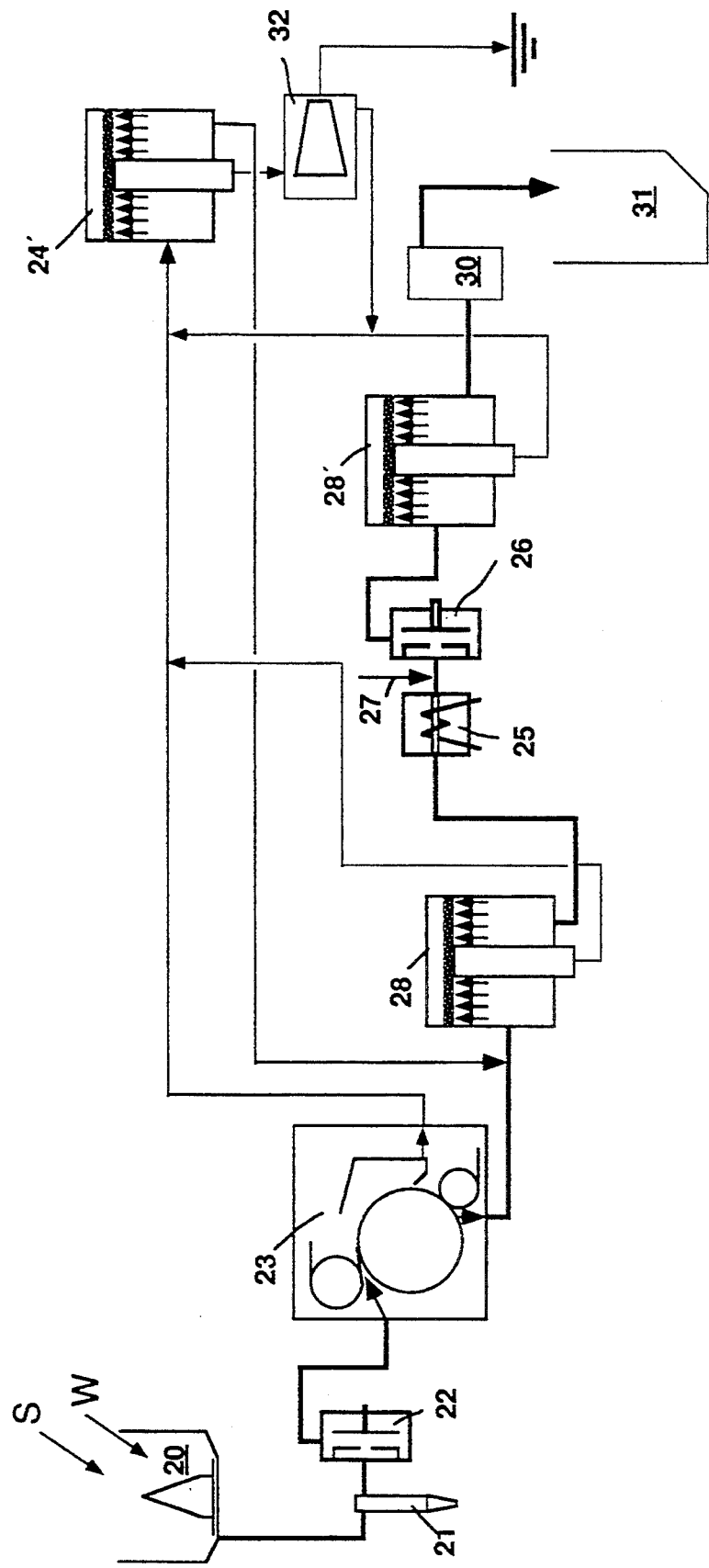

In accordance with FIG. 5 a plant is proposed in which the reject flotation cell 24' can, in a very economical manner, clean the washing filtrate from the high power washer 23 together with the foams from the deinking flotation cells 28 and 28'.

We claim:

1. A method for removing fine contaminants from used paper comprising the contaminants and fiber material suspended in water to form a suspension, the method comprising the steps of:

cleaning the suspension with at least one washing treatment to separate the suspension into a clean fraction and a washing filtrate, the washing filtrate including some of the fine contaminants and fiber material from the suspension;

subjecting the washing filtrate to a reject flotation treatment to form a first flotation foam and a fiber fraction, the fiber fraction substantially comprising fiber material from the washing filtrate;

directing the fiber fraction back into the clean fraction to form a clean fiber fraction;

cleaning the clean fiber fraction with an accept flotation treatment to separate a second flotation foam from the clean fiber fraction, the second flotation foam including some of the contaminants that were remaining in the clean fiber fraction; and directing the second flotation foam to the reject flotation treatment.

2. The method of claim 1 further comprising the steps of:

separating clean water from the first flotation foam;

directing the clean water back into the clean fiber fraction before the accept flotation treatment;

discarding the first flotation foam.

3. The method of claim 2 wherein the clean water separating step is carried out by directing the clean water into the clean fiber fraction after the cleaning step.

4. The method of claim 1 further comprising the step of, after the accept flotation treatment, cleaning the clean fiber fraction with a second accept flotation treatment so that a third flotation foam is separated from the clean fiber fraction, the third flotation foam including some of the contaminants that were remaining in the clean fiber fraction.

5. The method of claim 4 further comprising the steps of:

separating clean water from the third flotation foam;

directing the clean water back into the suspension before the cleaning step; and discarding the third flotation foam.

6. The method of claim 4 further comprising the step of dispersing the clean fiber fraction before the second accept flotation treatment.

7. The method of claim 6 wherein the dispersing step includes a bleaching treatment.

8. The method of claim 1 wherein the fiber fraction comprises at least half of the quantity of fiber material originally in the used paper.

9. The method of claim 1 wherein the clean fraction comprises at least two thirds of the quantity of fiber material orginally in the used paper.

10. The method of claim 1 wherein the fiber fraction comprises at least two thirds of the quantity of fiber material originally in the used paper.

11. An apparatus for removing contaminants from used paper, the apparatus comprising:

a source of used paper material, a means for delivering the used paper material to a material pulper for crushing the paper fiber material into a suspension comprising fiber material and the contaminants;

a washer, operably coupled to the pulper, for washing the suspension to form a clean fraction and a washing filtrate, the washing filtrate including some of the contaminants and fiber material from the suspension;

a reject flotation cell, operably coupled to the washer for separating the washing filtrate into a first flotation foam and a fiber fraction, the fiber fraction substantially comprising fiber material from the washing filtrate;

means for directing the fiber fraction back into the clean fraction to form a clean fiber fraction; and an accept flotation cell, operably coupled to the washer, for separating the clean fiber fraction into a second flotation foam and a clean filtrate, the second flotation foam including some of the contaminants and fiber material that were remaining in the clean fiber fraction, means for directing the second flotation foam into the reject flotation cell.

12. The apparatus of claim 12 further comprising a means for pre-cleaning the suspension before the suspension enters the washer.

13. The apparatus of claim 11 further comprising a dispersing apparatus, operably coupled to the accept flotation cell, for dispersing the clean filtrate.

14. The apparatus of claim 13 further comprising a second accept flotation cell, operably coupled to the dispersing apparatus, for separating a third flotation foam from the clean filtrate, the third flotation foam including some of the contaminants that were remaining in the clean filtrate.

15. The apparatus of claim 14 further comprising a means for thickening the clean filtrate and a means for bleaching the thickened clean filtrate, the bleached and thickened clean filtrate being directed into a paper machine supply.

16. The apparatus of claim 14 further comprising means for directing the third flotation foam into the reject flotation cell, the second and third flotation foams being separated into a reject material and a second clean filtrate.

17. The apparatus of claim 11 further comprising means for combining the second flotation foam with the washing filtrate before the washing filtrate enters the reject flotation cell, the reject flotation cell separating both the washing filtrate and the second flotation foam into a reject material, the fiber fraction and water, means for disposing the reject material, means for directing the fiber fraction back into the clean fraction to form the clean fiber fraction and means for directing the water back into the suspension at a point at least before the suspension enters the washer.

18. The apparatus of claim 12 further comprising a deflaker disposed between the precleaning means and the washer.

* * * * *